Feb. 15, 1949.    F. W. WHITEHEAD ET AL    2,461,948
HONING OR THE LIKE MACHINE
Filed Sept. 25, 1945    6 Sheets-Sheet 1
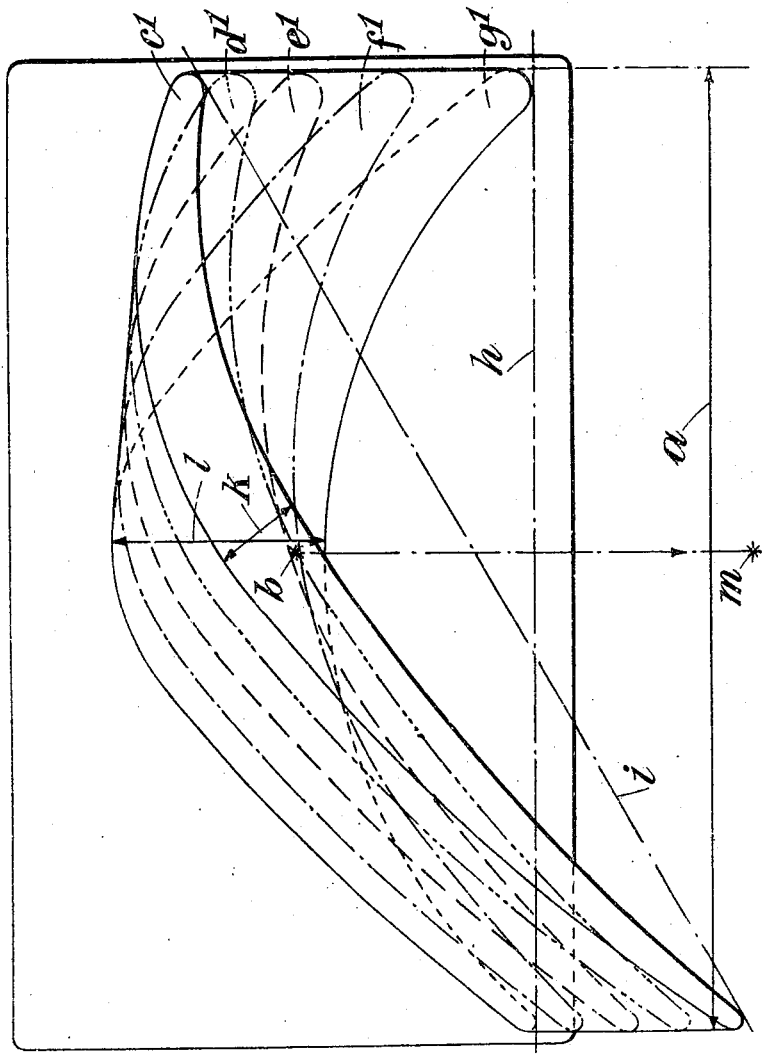
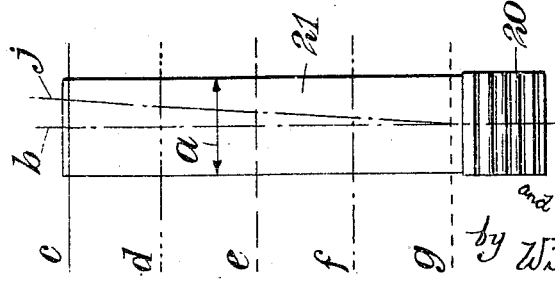
Inventors
F. W. Whitehead
and W. G. Lovering
by Wilkinson & Mawhinney
Attorneys

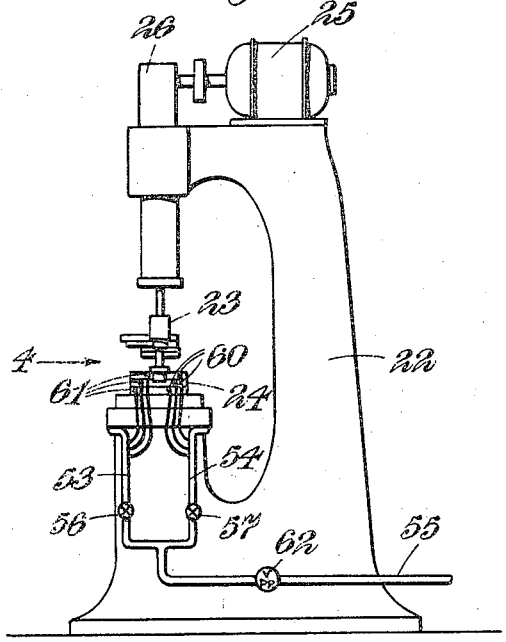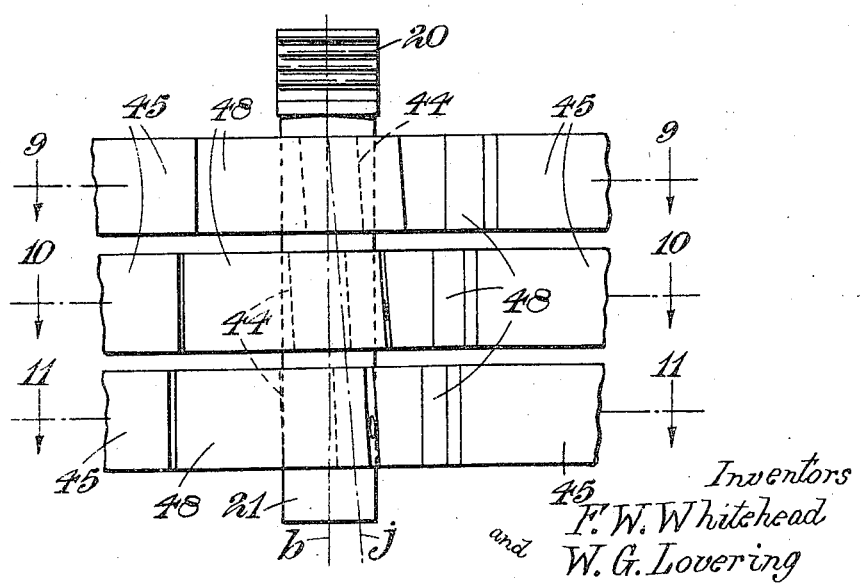

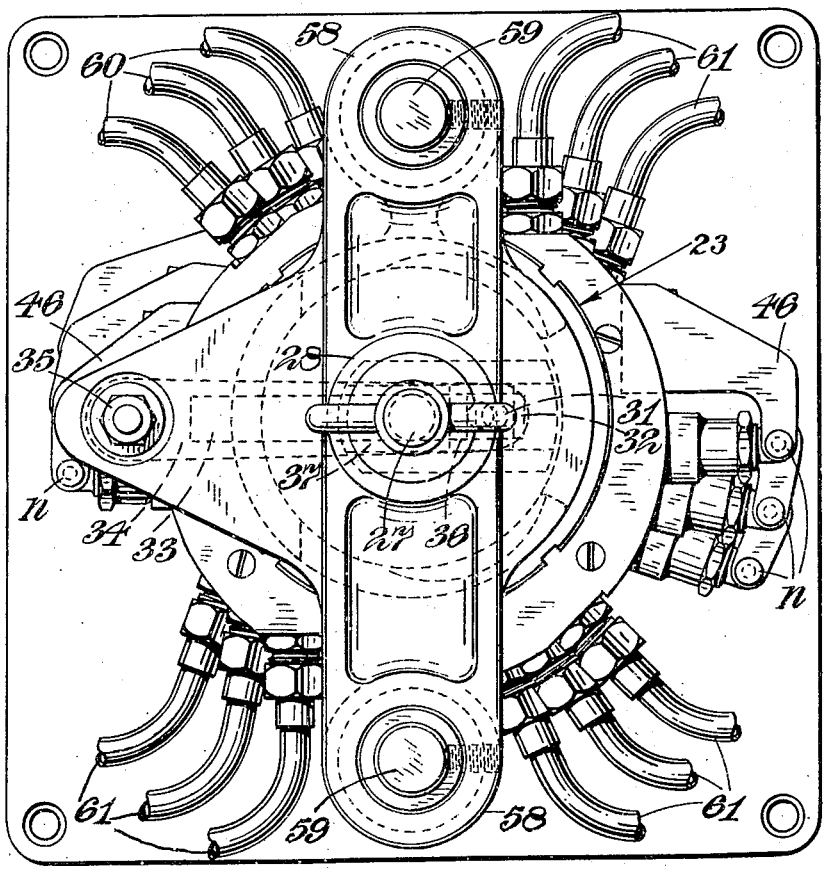

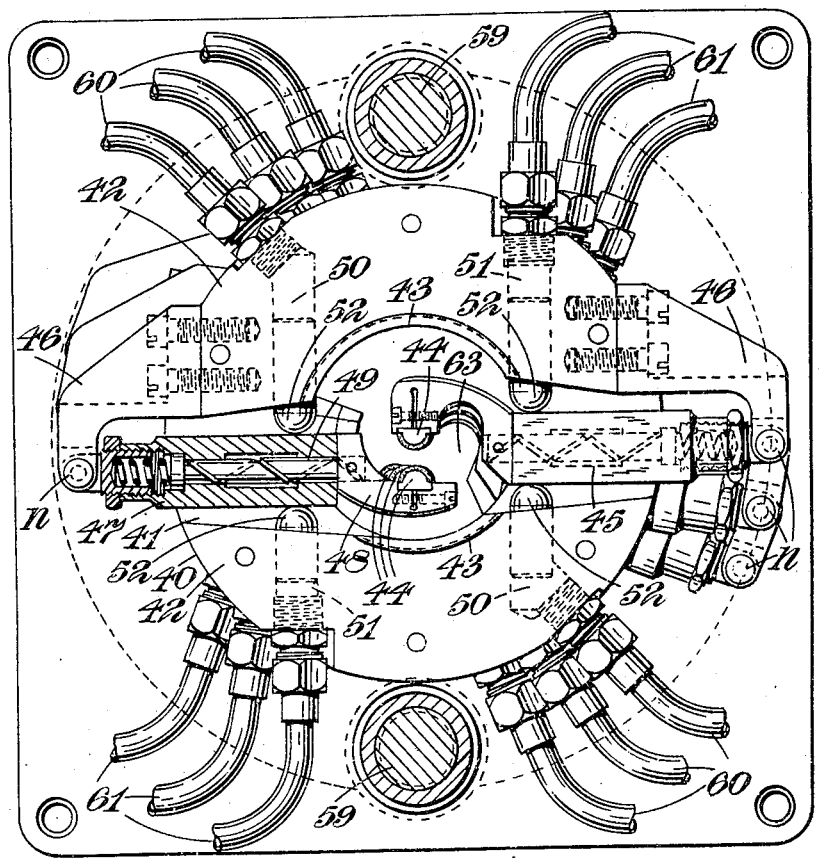

Patented Feb. 15, 1949

2,461,948

UNITED STATES PATENT OFFICE 2,461,948

HONING OR THE LIKE MACHINE

Frederick William Whitehead and William George Lovering, Bristol, England, assignors to The Bristol Aeroplane Company Limited, Bristol, England, a British company Application September 25, 1945, Serial No. 618,482
In Great Britain October 9, 1944

4 Claims. (Cl. 51—157)

1

This invention concerns improvements in or relating to honing or the like machines.

Honing machines as at present used are adapted for abrading regular surfaces such as cylinders and planes, the arrangement being that an area of the surface of the abrading element engages with the part to be machined throughout the honing operation this being permissible because of the regular nature of the surface of said parts. The present invention has for its principal object to provide a machine which is adapted for honing workpieces which do not possess such a regular surface and in which therefore it is impossible for an area of the abrading element to be brought into engagement with the surface of the workpiece throughout the honing or like operation.

According to the present invention a method of performing a honing or like operation is characterised in that the workpiece over whose surface the abrading element is adapted to move constitutes a pattern for said element, the latter being freely mounted with respect to the workpiece to enable it to follow the contour thereof as it is moved over the surface of the workpiece. According to another aspect of the present invention a machine for performing honing or the like operations is characterised in that the abrading element is adapted to make line contact with the workpiece and is mounted to enable it to conform to variations in the contour of the workpiece and maintain said line contact.

The abrading element is preferably mounted for movement by the workpiece in a direction towards and away from the surface of the workpiece which is to be abraded.

In this way it is ensured that whilst the abrading element and the workpiece are relatively moved so that the former travels over the surface of the latter, the abrading element will accommodate itself to variations in the contour of said surface.

If desired the abrading element may be mounted so as to be capable of tilting towards and away from the workpiece: this freedom of movement is provided when in certain positions the surface of the workpiece would otherwise be inclined to the line of contact which should be established between the element and the workpiece.

A specific embodiment of the present invention will now be described, by way of example, as applied to a machine for honing turbine blades, with reference to the accompanying drawings whereof—

Figure 1 is a front elevation of the turbine blade which is required to be honed;

Figure 2 is a plan view thereof to an enlarged scale showing the outline of the blade at various stations along the length thereof;

Figure 3 is a side elevation of a machine for honing turbine blades in accordance with the present invention;

Figure 6 is a view in the direction of arrow 6 of Figure 4;

Figure 7 is a section on the line 7—7 of Figure 4;

Figure 9:
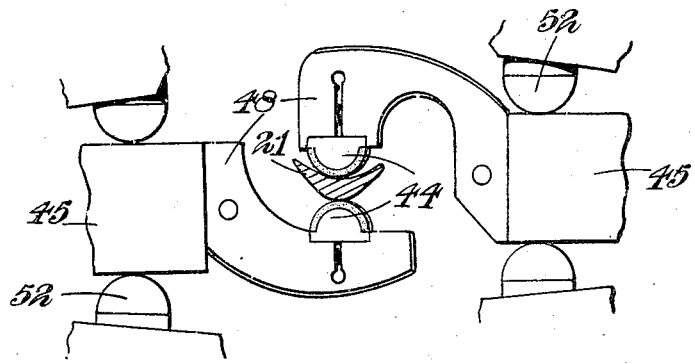
Figure 10:
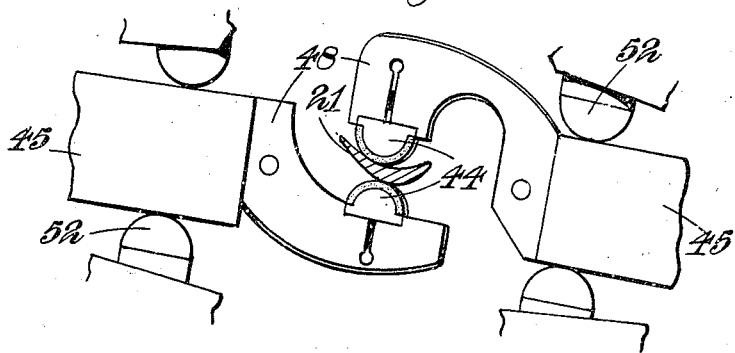
Figure 11:
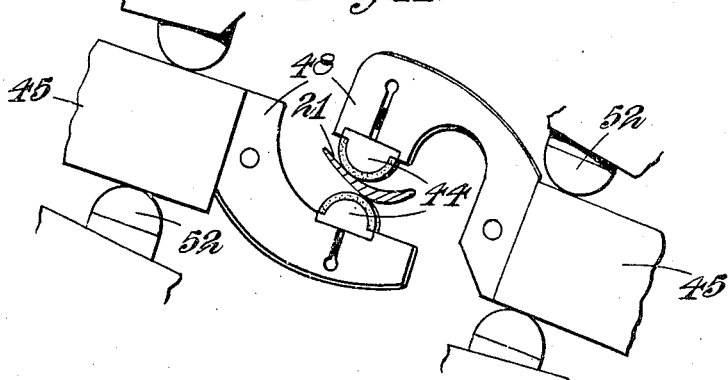

Figure 8 is a front elevation of the turbine blade during the honing operation and showing the hones in engagement with said blade, and Figures 9, 10 and 11 are respectively sections on the lines 9—9, 10—10 and 11—11 of Figure 8.

In order that the description of the construction and operation of the machine may be clearly understood the form of the turbine blade which is to be honed will first be described.

Referring to Figure 1 the blade comprises a shank 20 by which it is adapted to be secured to the rotor of the turbine and a vane 21 formed integral therewith. The surfaces of the vane are to be produced accurately with a fine finish by removal of a thin layer of material. The pre-honed vane must therefore be accurately formed and be slightly greater in size than the honed article. The accurately produced blank to be honed may be produced by machining, grinding, precision forging or precision casting—the vane blank is produced by the latter process. The projected width $a$ of the blade is constant throughout its length as is shown in Figure 2 so that the long axis $b$ of the vane lies midway between the leading and trailing edges of the vane. One side of the vane is formed with a concave surface throughout its length whilst the surface on the other side of the vane is convex. The curvature of the concave and convex surfaces at any station on the long axis (i.e., on planes passing through the long axis $b$ of the vane at right angles thereto) is not constant as it is not a surface of revolution. Thus, at each one of the stations $c$, $d$, $e$, $f$ and $g$ the curvature constantly varies across the blade as shown in Figure 2. At each of the stations referred to the outline of the vane is respectively indicated at $c^1$, $d^1$, $e^1$, $f^1$ and $g^1$. The profile of the concave and convex surfaces varies from the root of the vane to the tip thereof. The vane 21 is twisted around the longitudinal axis $b$ thereof from the root to the tip so that a line joining the entry and exit edges of the vane at a station near the root is inclined with respect to another similarly disposed line at another station along the vane. For example, at station $g$ a line joining the entry and exit edges of the vane is indicated at $h$ and this line is inclined with respect to the line $i$ joining the entry and exit edges of the vane at the station $c$. The concave and convex surfaces extend linearly along the vane so that parallel or substantially parallel straight lines lie on said surfaces. These straight lines (which are hereinafter referred to for convenience as "coincident" lines) are each disposed at the same or substantially the same angle to the long axis $b$ of the vane. One such coincident line is indicated in Figure 1 at $j$ and it will be appreciated that the other coincident lines on the concave and convex surfaces of the vane are disposed parallel or substantially parallel with the line shown. The vane thickness at the root of the blade is greater than at the tip so that the linear extensions of the curved surfaces taper towards the tip of the vane. This is shown in Figure 2 where the vane thickness at station $c$ is indicated at $k$ whilst the vane thickness at station $g$ is indicated at $l$.

The machine generally comprises a pedestal 22, a workhead 23 carried by the pedestal to receive the shank of the blade, a toolhead 24 which carries the hones, and electric motor 25 for driving the workhead and a gear box 26 through which the drive from the electric motor 25 is transmitted to the workhead 23. The toolhead 24 is disposed immediately below the workhead 23 so that when a blade is inserted in the workhead the vane thereof will project through the toolhead 24.

The workhead comprises a spindle 27 which is driven by the gear-box 26, a casing 28 into which the lower end of the spindle 27 enters, a bridge-piece 58 formed integral with the casing 28, pillars 59 carried by pedestal 22 and supporting bridge-piece 58, and a jaw 29 carried by the casing 28 and adapted to receive the shank 20 of the turbine blade. The shaft 27 is rotated and reciprocated by means of the gear box 26; the reciprocating movements of the shaft are imparted to the bridge-piece 58 (which slides on pillars 59) and the casing 28 so that jaw 29 and hence the turbine blade is correspondingly moved. The rotary movements of the shaft 27 are transmitted to an arm 30 carried within casing 28 for which purpose the lower end of the shaft 27 is supported in the casing 28. The arm 30 carries a pin 31 so that rotating of the shaft 27 results in the pin 31 being correspondingly rotated. The pin 31 enters a block 32 which is mounted within a groove 33 so as to be capable of sliding movement therealong, the groove 33 being formed in a link 34 which is pivotally mounted, by means of the bolt 35, to the casing 28. Since the pin 31 is at a smaller radial distance from the axis of rotation of the shaft 27 than the pin 35 the effect of rotating the arm 30 and pin 31 is to impart an oscillating movement to the link 34. The lower surface of the link 34 is provided with a sliding-block 36 which engages a groove 37 formed in a rotary member 38 which carries the jaw 29. The oscillations imparted to the link 34 are therefore transmitted through the sliding block 36 in the groove 37 to the member 38 and thus to the jaw 29 so that the latter is oscillated. The centre about which the oscillations referred to take place is arbitrarily selected to lie on the concave side of the vane and parallel with the long axis $b$ thereof when the blade is mounted in the jaw 29—the arbitrarily selected centre of oscillation is indicated at $m$ in Figures 2 and 4. The centre of oscillation $m$ is such that the vane 21 moves over an arc of a circle which approximates generally to the curvature of the concave and convex surfaces of the vane. The members of the jaw 29 are adjustable towards and away from each other and are capable of being locked in position by means of the screw 39.

The toolhead 24 is provided with a plurality of hones three of which engage the concave side of the vane. The hones are pressed into engagement with the vane whilst it is simultaneously reciprocated and oscillated as will be hereinafter described so that the whole of the two surfaces of the vane are brought under the hones.

Figure 4:
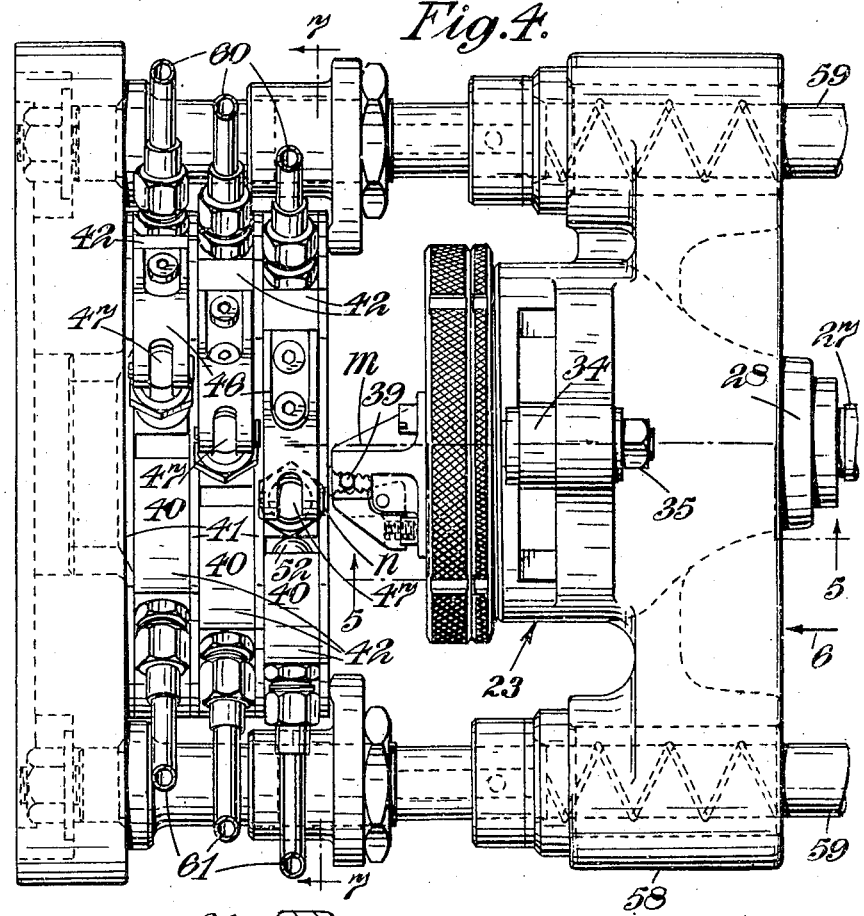
Figure 4 is a view in the direction of the arrow 4 of Figure 3 showing a part of the machine to an enlarged scale.
Figure 5:
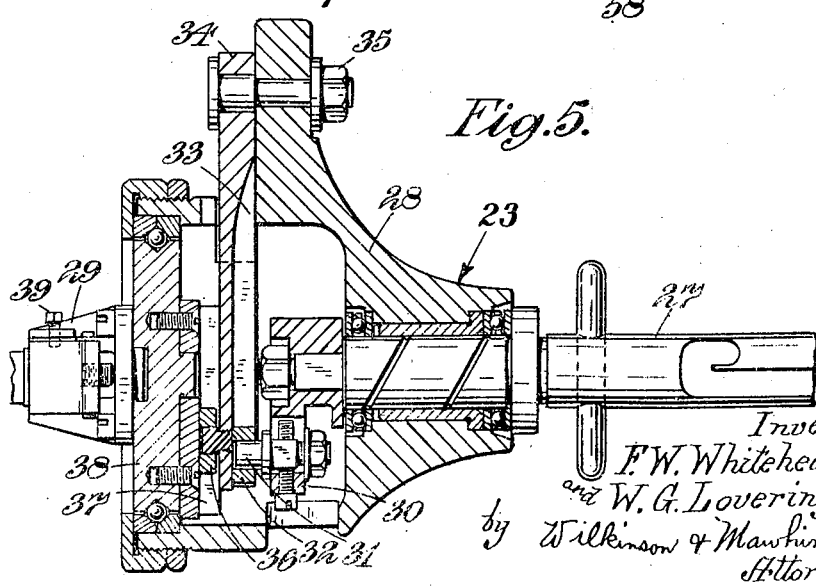
Figure 5 is a section on the line 5—5 of Figure 4.

The toolhead 24 comprises a plurality of superposed units 40 each of which is formed with a base plate 41 and a pair of stirrup members 42 spaced apart and secured to said base plate. Each stirrup member 42 is provided with a projecting flange 43 (Figure 7) whilst the base plate has a central aperture 63 which is adapted to receive the projecting flanges 43 of the next adjacent toolhead unit 40 when these are disposed in superposed relationship as shown in Figure 4. It will be clear therefore that units 40 of the toolhead 24 are located relative to each other by a spigot joint. In the particular toolhead shown in the accompanying drawings three such superposed units 40 are spigoted together as described. The hones 44 are carried by radial arms 45 which lie between the stirrup members 42 and extend to within the central aperture of the base plate, each hone 44 being carried by one such arm 45. One of the stirrup members 42 (see Figure 7) of each toolhead unit 40 is provided with a pair of projecting lugs 46 which extend towards diametrically opposite points of the unit, one such lug being provided for each arm 45. The three arms carrying the hones 44 associated with the concave surface of the vane 21 are each pivotally mounted to one of the lugs 46 disposed one one side of the toolhead whilst the arms carrying the hones 44 associated with the convex surface of the vane are each pivotally mounted to one of the lugs 46 disposed on the opposite side of the toolhead. The pivotal axis $n$ of each arm 45 is such that its hone 44 is capable of movement towards and away from the turbine blade when the latter is mounted in the jaw 29. When the blade is so mounted the pivotal axis $n$ is disposed parallel with the long axis $b$ of the blade.

The form of the surface of the vane 21 prohibits the use of a hone which engages over an area with the surface of the vane. Accordingly resort is had to a hone having a convex surface which extends along that edge thereof that is adapted to engage with the surface of the vane so that at all positions of engagement the crest of the hone makes a line contact with said surface (see Figures 8 to 11). In view of the fact that the coincident lines $j$ on the concave and convex surfaces of the vane are disposed at an angle to the long axis b thereof, each hone is arranged so that a line extending along the crest thereof will be disposed at this angle to the long axis. In Figure 8 the three superposed hones which engage the concave side of the vane are shown in the position which they assume during the machining operation and it will be noted that each hone is inclined at the same angle to the long axis b of the vane and that the crest of each hone lies upon a coincident line of the vane. The hones associated with the convex side of the vane are similarly disposed. In this way it is ensured that the line of contact between each hone 44 of the surfaces of the vane 21 will be maintained throughout the honing operation. Furthermore, the pivot point n of each arm 45 associated with the concave surface of the vane is circumferentially spaced from the next adjacent arm so that the crests of the three hones are upon the same coincident line j as is clear from Figure 8. This arrangement of the lugs 46 and the arms 45 is shown in Figures 6 and 7.

A similar construction is provided for the arms 45 associated with the concave surface of the vane.

To provide for the variation in the vane thickness which exists from the root thereof towards the tip, each of the pivotal arms 45 is formed in two parts. As shown in Figure 7 each arm 45 comprises an upper-arm 47 which is pivotally mounted to one of the lugs 46 carried by the stirrup member 42 and a fore-arm 48 pivotally mounted to said upper arm 47. To this end, the fore-arm 48 is provided with a pin 49 which extends longitudinally through the upper-arm 47 and is free to rotate therein, the axis of rotation of the fore-arm being normal to the pivotal axis n of the upper-arm. The fore-arm 48 carries the hone 44.

The construction of each arm 45 is such that the pivotal axis of the fore-arm 48 (that is the pivotal axis of the pin 49) intersects the pivotal axis n of the upper-arm 47 and is tangential to the crest of its associated hone 44.

Associated with each arm 45 is a pair of cylinders 50, 51, the plungers 52 of which engage the upper-arm 47. The cylinders 50, 51 are formed in the stirrup members 42 and each of the pair of cylinders is disposed on opposite sides of the arm 45 so that when cylinder 51 is brought into operation the arm 45 is turned about pivot point n to move the associated hone 44 towards and into contact with the blade so that honing may proceed and when the cylinder 50 is brought into operation the arm 45 is turned about axis n to carry the associated hone 44 away from and free of the blade. The cylinders 51 will be referred to as the "honing" cylinders and the cylinders 50 as the "return" cylinders. The honing and return cylinders 51 and 50 respectively are connected with a supply of air under pressure by means of pipe lines 61 and 60. All the pipe lines 61 of the honing cylinders 51 of the toolhead 24 are connected together to a common pipe line 53 (Figure 3) so that air is simultaneously applied thereto. Similarly all the pipe lines 60 of the return cylinders 50 are connected together to a pipe line 54 so that air will also be simultaneously applied to them. Disposed between the main pipe line 55 which carries the compressed air to the tool-head and each of the branch pipe lines 53, 54, is a valve 56, 57. It will be understood of course that suitable means are provided for exhausting the compressed air from the set of honing cylinders 51 when pressure air is passed to the set of return cylinders 50 and vice versa.

The operation of the machine is as follows:

Let it be assumed that the valve 57 is adjusted to permit air under pressure to pass by pipe lines 54 and 60 to all the return cylinders 50 of the toolhead that the honing cylinders 51 are connected to exhaust, the valve 56 being closed to cut off the supply of compressed air from said honing cylinders. The set of hones 44 associated with the concave and convex surfaces of the vane are therefore moved away from each other, the arms 45 pivoting on lugs 46. The turbine blade is mounted in the workhead so that the shank 20 thereof is gripped in the jaw 29 and so that the vane 21 is directed towards the toolhead. During this operation the workhead is disposed sufficiently far above the toolhead to permit the insertion of the blade. The bridge-piece 58 is then lowered to bring the workhead to the position shown in Figure 4 and so that the vane 21 of the turbine blade enters the toolhead 24 and lies between the two sets of hones 44. When the machine is set up as described, valve 57 is closed to cut off the supply of compressed air to the return cylinders and thereafter valve 56 is opened to connect the honing cylinders 51 with the compressed air supply. As a result the return cylinders are connected to the exhaust and the arms 45 are moved by the honing cylinders so that the hones 44 are simultaneously brought into contact with the two surfaces of the vane. The motor 25 is then started and transmits drive as described through the gear-box 26 to the workhead 23 so that the turbine blade has imparted to it a compound movement of reciprocation and oscillation. The honing operation then commences and continues whilst the compressed air is admitted to the honing cylinders 51. It will be clear from what has been stated above that the two surfaces of the vane are each engaged by three hones 44 each of which is movable independently and applied to the surface of the vane by an associated individual cylinder 51. It is essential if the abrading operation is to take place uniformly over the surface of the blade that each hone be applied with the same pressure and that the latter does not vary substantially throughout the honing operation. To this end the air supply for all the honing cylinders is obtained from a common source by way of the main pipe line 55 and a relief valve 62 is provided in said pipe line to insure that the air supply is maintained at substantially constant pressure.

Throughout the operation the hones associated with the concave surface are in contact with the latter so that the line of contact between each hone and the concave surface is disposed upon a coincident line as described above. A similar disposition of the hones relative to the convex surface is provided for. During the honing operation the oscillating movement imparted to the blade brings the whole profile of the vane at each station along its length beneath a hone. The latter must therefore be capable of adjustment to accommodate for the variations in the radial distances from the axis of oscillation m to points on the profile of the vane. This is provided for by the pivotal movement which the hone carrying the arms 45 enjoy relatively to the lugs 46 of the stirrup member 42. Since the part of the vane along the length thereof which is brought beneath each hone is continuously changing due to the reciprocating movement imparted to the blade and in view of the fact that the vane surfaces taper from the root to the tip, the radial distance from the axis of oscillation to corresponding points on the surface of the blade at different stations will vary. By "corresponding points" is meant points at different stations which lie upon the same coincident line. The hones 44 are capable of adjustment to accommodate for this profile variation by the pivotal movement which the hone-carrying fore-arms 48 enjoy relatively to the upper-arms 47.

It will be seen therefore that by mounting each hone so that it is free to move about two axes it will accommodate itself to the contour which is brought beneath it during the reciprocating and oscillating movement of the vane and that the line contact established between each hone 44 and the vane 21 along a coincident line is maintained throughout the honing operation. It is only necessary therefore to select the reciprocating and oscillating motions so as to ensure that the hones associated with each surface of the vane (concave or convex) will pass entirely over the vane in a cyclic manner. The amount of material removed will then be uniform over the surface of the blade.

It is to be understood that the turbine blade constitutes a pattern which is followed by the hones 44 during the machining operation and that the form of the pre-machined blade determines the shape of the blade when it is machined. It is essential therefore that the pre-honed blades be accurately produced dimensionally and geometrically so that they are similar to the finished blade. This may be done either by forging or casting. Accordingly a honing machine in accordance with the present invention finds a particular application when used for producing a highly polished surface on turbine blades which are required to be accurately produced within small dimensional limits.

The construction of the toolhead described above is such that the honing machine is readily adapted for machining articles of different lengths since in order to accommodate for variations in the length of the article it is only necessary to provide the required number of superposed toolhead units. For instance, if a machine be adapted to hone a turbine blade which is twice the length of the blade for which three toolhead units have been provided, then it is only necessary to incorporate a further three such toolhead units. The spigot joint between the various units readily enables this to be done.

Although the specific embodiment of the invention has been described as applied to a machine for honing turbine blades it is to be understood that it has application to the honing of other articles. Moreover, the machine is capable of adaptation for honing plane surfaces as well as curved surfaces. In such a case it will be clear that the article will be reciprocated in two directions instead of having imparted to it a reciprocating and oscillating movement.

We claim:
1. A honing or the like machine for blades having a curved surface upon which lie coincident lines as hereinbefore defined comprising a carrier for the blade, means to oscillate the carrier about an axis approximating to the centre of curvature of the blade, an abrading element to engage the blade along a coincident line only, a first and second support for the abrading element whereby the latter is pivotally mounted for movement towards and away from the blade about an axis parrallel with the axis of oscillation of the blade and about an axis normal to said pivotal axis for tilting movements relatively to a coincident line on the blade and means for resiliently holding the abrading element against the blade so that it is independently movable about each support solely by the oscillating blade which determines its own final shape.

2. A honing machine for blades having a curved surface upon which lie coincident lines as hereinbefore defined comprising a carrier for the blade, means to oscillate the carrier about an axis approximating to the centre of curvature of the blade, a plurality of abrading elements in superposed relationship each to engage the blade along a coincident line only, a first and second support for each abrading element whereby the element is pivotally mounted for movement towards and away from the blade about an axis parallel with the axis of oscillation of the blade and about an axis normal to said pivotal axis for tilting movements relative to a coincident line on the blade and means for resiliently holding each abrading element against the blade so that it is independently movable about each support solely by the oscillating blade which determines its own final shape.

3. A machine for performing honing or the like operations as claimed in claim 2 in which the abrading elements are applied to a workpiece by means of pneumatic pressure.

4. A honing machine as claimed in claim 2 wherein the blade carrier is reciprocated along the axis of oscillation thereof whilst it is being oscillated.

FREDERICK WILLIAM WHITEHEAD.
WILLIAM GEORGE LOVERING.

REFERENCES CITED

The following references are of record in the file of this patent:

UNITED STATES PATENTS

| Number | Name | Date |
| --- | --- | --- |
| 1,515,568 | Fleming et al. | Nov. 11, 1924 |
| 1,536,928 | Reitz et al. | May 5, 1925 |
| 1,684,872 | Logue | Sept. 18, 1928 |
| 1,843,301 | Player et al. | Feb. 2, 1932 |
| 2,164,867 | Blood | July 4, 1939 |